US006318645B1

(12) United States Patent
Robinson

(10) Patent No.: US 6,318,645 B1
(45) Date of Patent: Nov. 20, 2001

(54) VARIABLE RATE FLOW DIVIDER

(76) Inventor: John Rodger Robinson, 1230 Meridian Road N.E., Calgary, Alberta (CA), T2A 2N9

( * ) Notice: Subject to any disclaimer, the term of this patent is extended or adjusted under 35 U.S.C. 154(b) by 0 days.

(21) Appl. No.: 09/049,914

(22) Filed: Mar. 30, 1998

(30) Foreign Application Priority Data

Feb. 9, 1997 (CA) .................................................. 2,216,332

(51) Int. Cl.⁷ .............................. B05B 9/06; B65D 88/54
(52) U.S. Cl. ........................ 239/155; 239/304; 239/159; 222/330; 222/485
(58) Field of Search ...................................... 239/159, 170, 239/172, 433, 436, 155, 304; 222/330, 485, 406, 487

(56) References Cited

U.S. PATENT DOCUMENTS

| | | | |
|---|---|---|---|
| Re. 35,100 | * 11/1995 | Monson et al. ........................ | 239/1 X |
| 1,514,330 | * 11/1924 | Neal et al. ............................ | 222/330 |
| 3,716,167 | * 2/1973 | Huntington ............................ | 222/63 |
| 4,313,386 | * 2/1982 | Boldt et al. ........................ | 222/330 X |
| 5,751,576 | * 5/1998 | Monson ........................... | 239/161 X |

* cited by examiner

*Primary Examiner*—Kevin Weldon
*Assistant Examiner*—Sean P. O'Hanlon

(57) ABSTRACT

A fluid distribution system is especially useful in agricultural apparatus for delivering liquid agricultural chemicals to agricultural fields. The system includes a flow divider with a cylindrical stator with a ring of collection chambers around the bottom of the stator and a rotor having a flow passage from the center of the top end to the bottom end above the ring of collection chambers. The flow dividers may be cascaded to provide multiple outlets. The system may include plural liquid supplies and a mixer for mixing the liquids from the plural supplies to provide a desired blend upstream of the flow divider. It is preferred that the flow of each liquid can be varied to vary the blend. The system may also include a control that varies the blend according to requirements as distribution proceeds. This may include a recorded mapping of a field being treated and a position sensor, for example a global position sensor (GPS) for monitoring the position of the apparatus in the field. The liquid blend is then controlled according to the requirements of the field position.

12 Claims, 4 Drawing Sheets

VARIABLE RATE FLOW DIVIDER

FIELD OF THE INVENTION

The present invention relates to fluid distributors, especially agricultural apparatus for delivering liquid agricultural chemicals to agricultural fields, and to certain components that may be used in such apparatus.

BACKGROUND

One of the problems that arise with current agricultural chemical distribution apparatus is the division of the liquid flow into equal flows for delivery to separate dispensers, for example spray nozzles or fertilizer tubes. Generally, this is accomplished using manifolds or multiple orifice systems which suffer from a number of disadvantages. They can, for example, plug and require frequent maintenance.

Another limitation of conventional flow dividers is an inability to operate properly with wide variations in flow rates.

In the application of agricultural liquids, e.g. herbicides, pesticides and fertilizers, it is found that different application rates of the liquids are optimal for different areas. Prior art delivery apparatus, for example sprayers and fertilizer injectors, that are capable in delivering these products at different rates require the operator to interrupt operation to adjust or replace components to vary the flow rates. Consequently, the application rate may at times be quite different from the optimum.

The present invention is concerned with improvements in the prior art.

SUMMARY

According to one aspect of the present invention there is provided a flow divider for fluent materials comprising:

- a rotor having an axis of rotation and axially spaced inlet and outlet ends;
- a flow passage through the rotor, from the inlet end to the outlet end, the flow passage having a flow passage outlet at the outlet end of the rotor, the flow passage outlet being spaced radially from the axis of rotation;
- rotor drive means for rotating the rotor about the axis of rotation;
- a stator including an annular array of collection chambers surrounding the axis of rotation and with open inlet sides spaced radially from the axis of rotation to be confronted in sequence by the flow passage outlet as the rotor rotates; and
- discharge openings from the respective collection chambers.

As the rotor rotates, fluent material is delivered to the inlet end of the flow passage and thence in sequence to the collection chambers. The chambers provide continuous flows of material from the outlets. When the chambers are of the same circumferential extent, and the rotor is rotated at uniform speed, the chambers will all receive the same volume of material on each rotation of the rotor so that the delivery to each outlet is the same.

The flow divider uses no manifolds and no orifices to plug or block the flow. The flow rate can be varied by varying the flow rate into the divider.

In order to provide an increase number of flow divisions, the dividers may be cascaded. Thus, according to another aspect of the present invention there is provided a flow divider system for dividing a flow of a fluent material, said system comprising:

- a first flow divider including a fluent material inlet and a plurality of first divider outlets; and
- a plurality of second flow dividers, each having a second divider inlet coupled to a respective one of the first divider outlets and each having a plurality of second divider outlets;

each of said flow dividers comprising:

- a rotor having an axis of rotation and axially spaced rotor inlet and rotor outlet ends;
- a flow passage through the rotor, from the rotor inlet end to the rotor outlet end, the flow passage having a flow passage outlet at the rotor outlet end and spaced radially from the axis of rotation of the rotor;
- rotor drive means for rotating the rotor about the axis of rotation;
- a stator including an annular array of collection chambers surrounding the axis of rotation, with open inlet sides spaced radially from the axis of rotation to be confronted in sequence by the flow passage outlet as the rotor rotates, the divider outlets comprising outlets from respective ones of the collection chambers.

Preferably a pump is used between the primary and secondary dividers. A particularly convenient arrangement is where the primary divider delivers multiple flows to respective chambers of a multi-chamber diaphragm pump. The chambers are separated to handle the separate flows. This arrangement provides equal flow rates for the plural flows to the secondary dividers.

A further aspect of the invention provides an agricultural liquid distribution apparatus which includes the flow divider in a system for delivering liquid to plural discharge devices, which may be sub surface injectors or spray nozzles.

The apparatus may include plural liquid supplies and a mixer for mixing the liquids from the plural supplies to provide a desired blend upstream of the flow divider. It is preferred that the flow of each liquid can be varied to vary the blend. The apparatus may include a control that varies the blend according to requirements as distribution proceeds. This may include a recorded mapping of a field being treated and a position sensor, for example a global position sensor (GPS) for monitoring the position of the apparatus in the field. The liquid blend is then controlled according to the requirements of the field position.

The liquid application rate may also be varied with a variable speed pump. The control may have a ground speed input to be used as a variable in determining flow rates through the apparatus.

BRIEF DESCRIPTION OF THE DRAWINGS

In the accompanying drawings, which illustrate an exemplary embodiment of the present invention.

DETAILED DESCRIPTION

Figure 1:
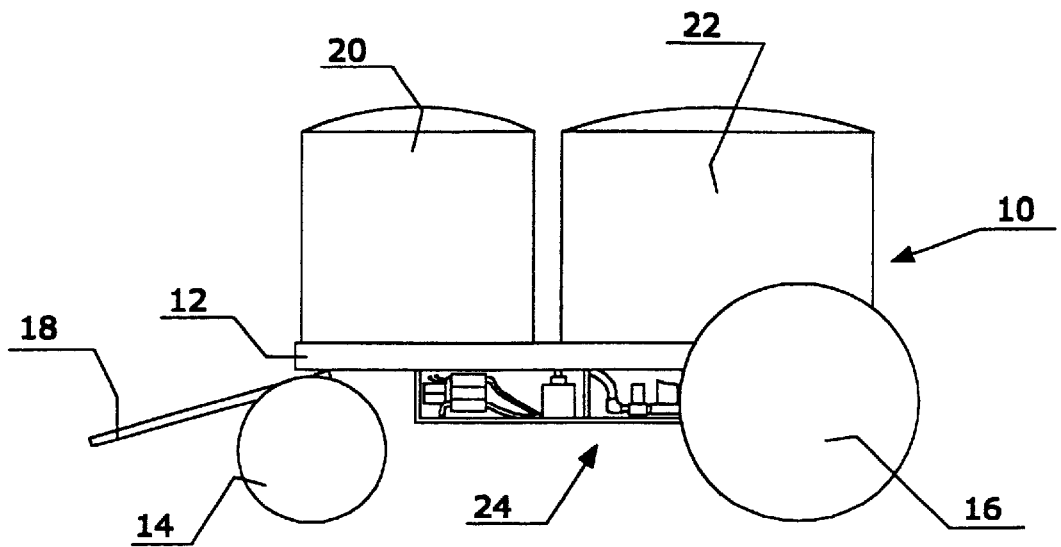
FIG. 1 is a side elevation of a tank carrier for an agricultural chemical sprayer or injector.
Figure 2:
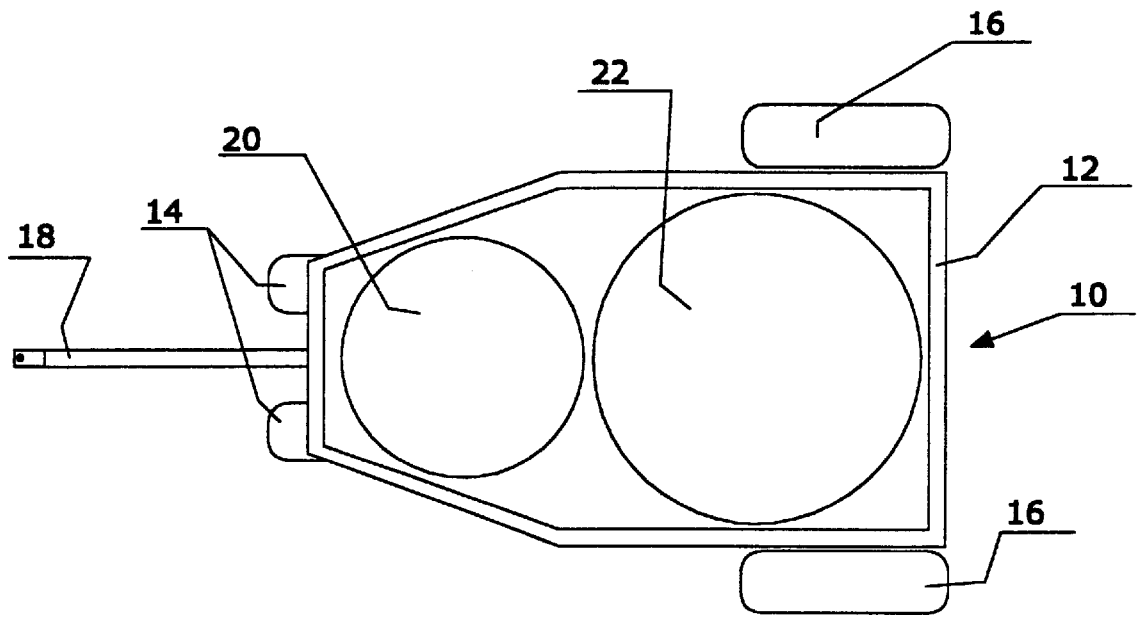
FIG. 2 is a plan view of the carrier of FIG. 1.

Referring to the accompanying drawings and especially to FIGS. 1 and 2, there is illustrated a tank carrier 10 for an agricultural sprayer or injector. The carrier includes a frame 12 mounted on two front wheels 14 and two rear wheels 16. The frame has a tongue 18 for pulling the carrier across a field to be sprayed. The frame carries two tanks 20 and 22 for agricultural chemicals to be applied to the field by a sprayer assembly mounted on the frame 12, or with injectors carried by a following cultivator or tool bar. The frame also carries a flow control system 24 mounted below the tanks.

Figure 3:
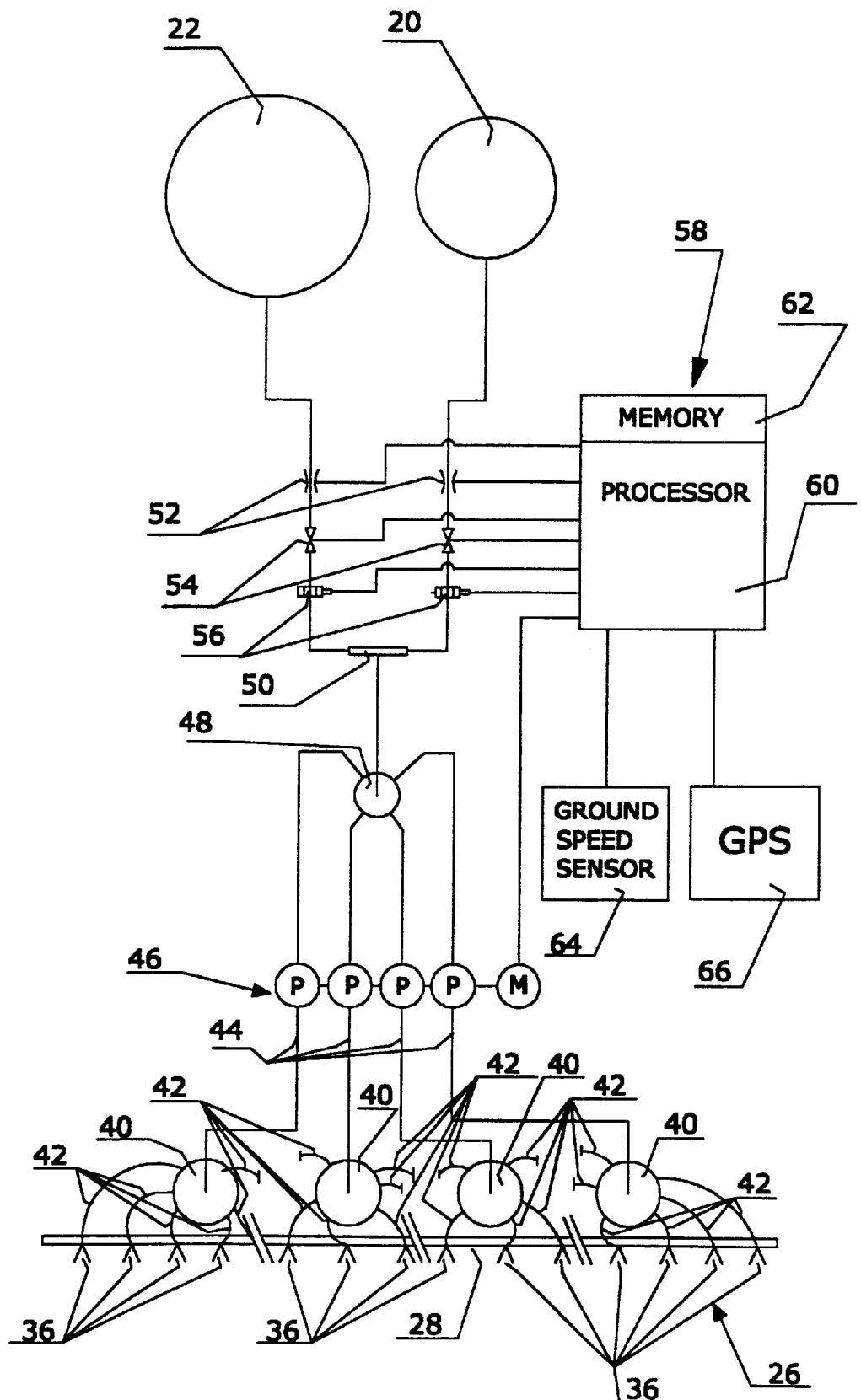
FIG. 3 is a schematic of a sprayer system.

The sprayer system illustrated in FIG. 3 includes a spraying assembly 26 with a boom 28. The boom carries spray nozzles 36 uniformly distributed along the tube.

At spaced points along the boom are secondary flow dividers 40. Each of the secondary flow dividers has a set of tubes 42 leading from the bottom of the divider to individual ones of the nozzles 36. A supply tube 44 delivers liquid into the top of each secondary divider. The tube 44 is connected to a respective outlet of a four-way diaphragm pump 46. This pump has four pumping chambers which are normally coupled. In this case, the individual chambers handle separate flows from a primary flow divider 48. The intake of the primary divider 48 is connected to a flow mixer 50 with two input streams from the respective tanks 20 and 22. The flow from each tank, in passing to the mixer, passes through a flow meter 52, a variable control valve 54 and a shut-off valve 56.

The system is operated by a control 58. This control includes a processor 60 with a memory 62 for recording mapping data for a field to be sprayed. The mapping data indicate the optimum application of chemicals at the various positions in the field. Maps of this sort are developed using known techniques from topological information, yield monitors used with harvesting equipment, soil samples and the farmer's basic knowledge of the conditions of the field.

The processor receives input from a ground speed sensor 64 and a global position sensor (GPS) 66. In use the GPS is monitored to determine the current location of the sprayer. This information is associated with the mapping data to determine the correct application of chemicals of the field at that position and the processor generates control signals for the variable valves 54 and the shut off valves 56. The flow meters provide feed back signals representing the current flow rate of each of the liquids being sprayed. Individual control of the two liquids ensures the correct blend of liquids. The processor also receives signals from the ground speed indicator 64.

The application rate of the liquids is controlled by controlling the speed of the pump 46, using signals from the processor.

Figure 4:
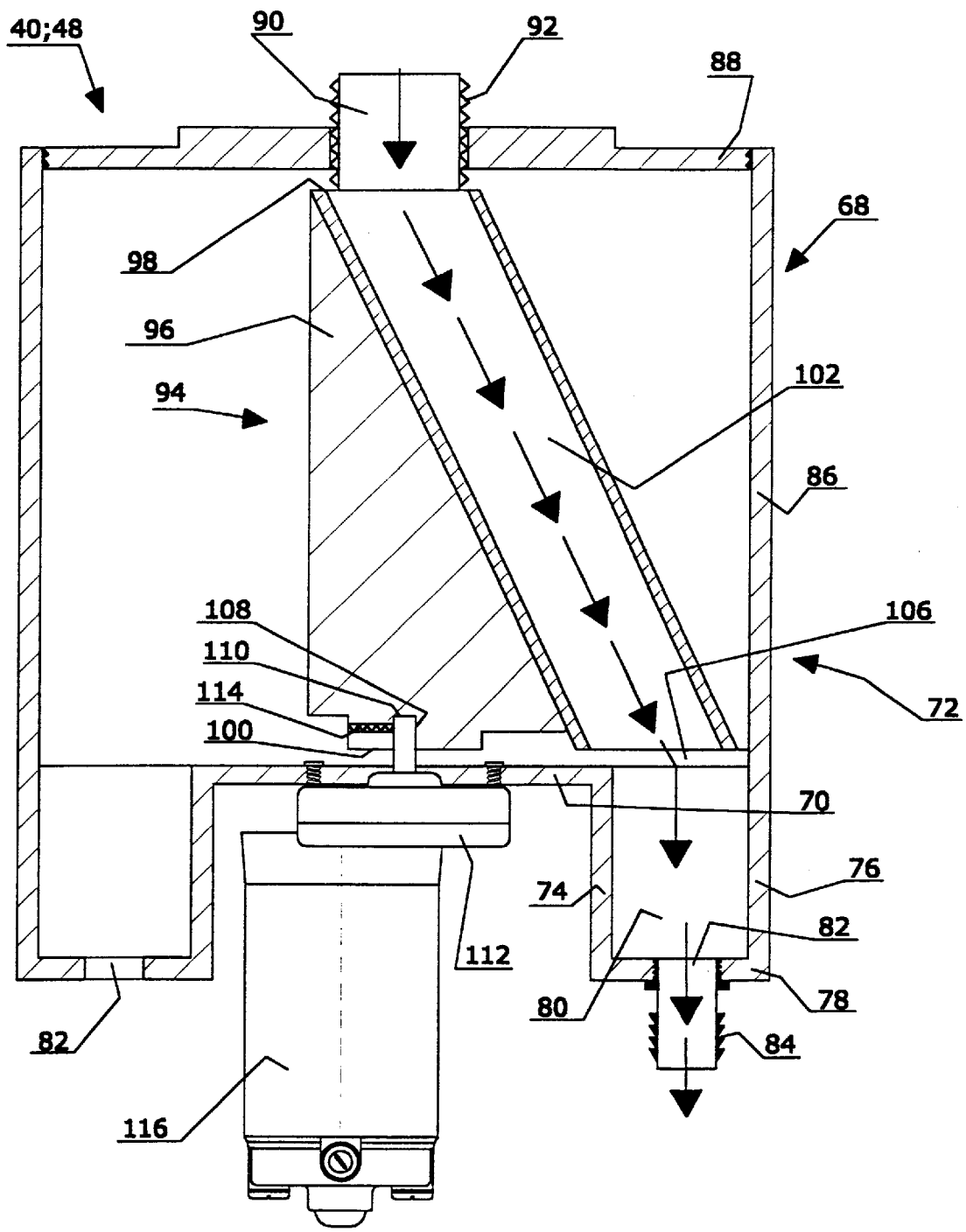
FIG. 4 is a vertical cross section of a flow divider.
Figure 5:
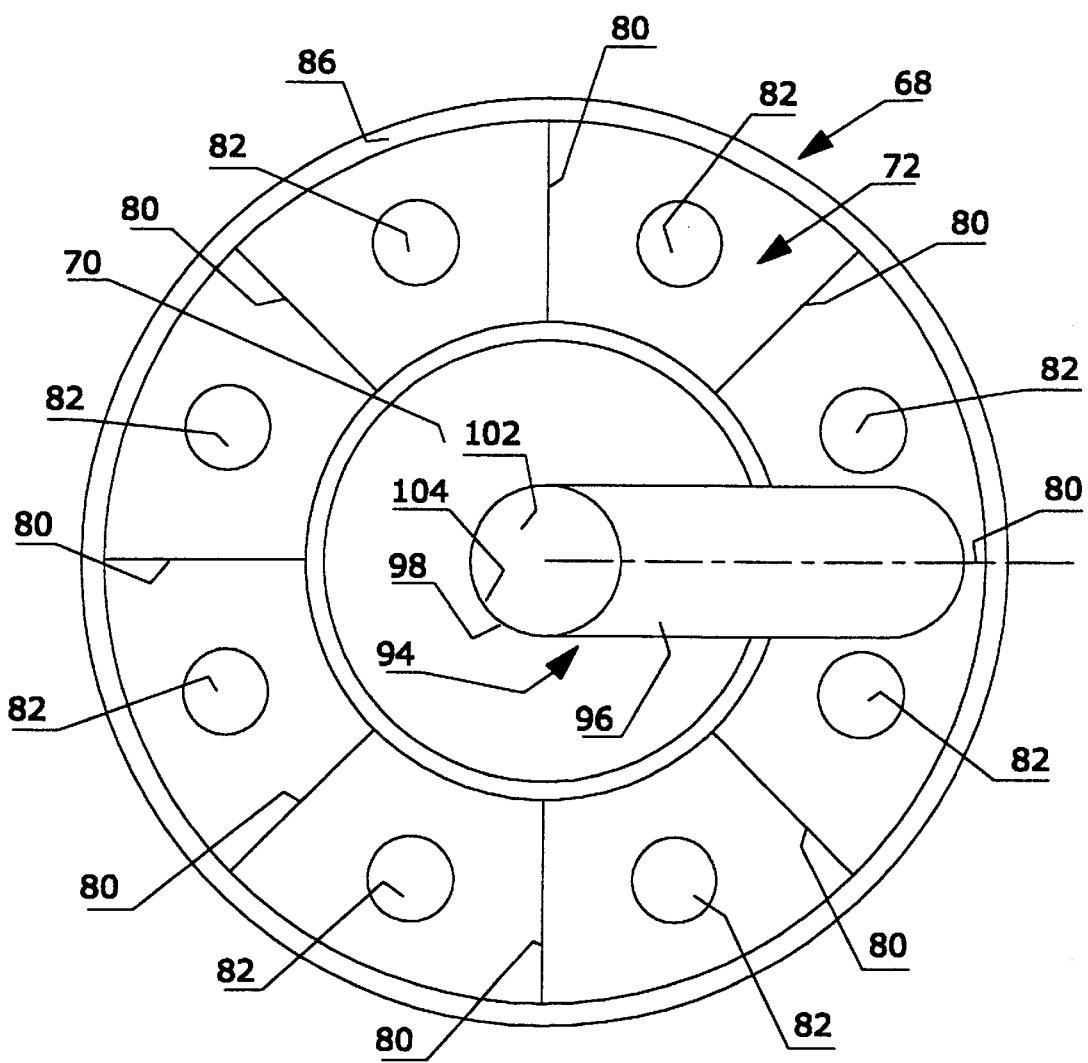
FIG. 5 is a plan view of the flow divider with the cover omitted.

FIGS. 4 and 5 illustrate the construction of one of the flow dividers. The divider includes a cylindrical housing 68 with a circular base 70 of smaller diameter. Around the base is a ring of collection chambers 72 defined by an inner cylindrical wall 74, an outer cylindrical wall 76 and an annular base wall 78. The collection chambers are separated into equal annular segments by radial divider panels 80. Each collection chamber has an outlet opening 82 in the base wall 78 which discharges the contents of the chamber into a hose coupling 84. As illustrated in FIG. 5, the outlet opening area is smaller than that of the collection chamber 72.

The cylindrical wall 86 of the housing 68 is an upwards extension of the outer wall 76 of the collection chambers. The top of the housing is closed with a circular top wall 88 with central a fluid inlet 90 carrying a threaded nipple 92 for connection to a supply line.

In the housing is a rotor 94. This includes a rotor body 96 with an upper inlet end 98 and a lower outlet end 100. A fluid passage 102 is formed in the rotor and extends from the center of the rotor inlet end to the outlet end adjacent the side wall 86. At the inlet end of the rotor, the fluid passage has an inlet 104, aligned with the fluid inlet 90 to the housing. At the outlet end of the rotor, the fluid passage has an outlet 106 that confronts the open top of the ring of collection chambers 72.

At the bottom of the rotor is a bore 108 concentric with the housing. This receives the shaft 110 of a gear reducer 112 mounted on the base wall 70 of the fluid divider. The rotor is secured to the shaft using a set screw 114. The gear reducer is driven by an electric motor 116.

In operation, the rotor is driven at a constant speed. Liquid is delivered to the inlet 90 and flows along the fluid passage 102 through the rotor to be delivered in equal amounts to the various collection chambers 72 as the fluid passage outlet sweeps past the open tops of the chambers. From the individual chamber outlets, the liquid is drawn into the pump 46 from which it is pumped to the secondary flow dividers.

While one particular embodiment of the invention has been described in the foregoing, it is to be understood that other embodiments are possible within the scope of the invention. Thus, for example, the illustrated embodiment uses a cascaded arrangement of primary and secondary flow dividers. This is not necessary where the requisite number of flow divisions is sufficiently small that it can be handled by a single flow divider. The apparatus illustrated and described is an agricultural sprayer. Other devices for distributing fluids of one sort or another may also embody various aspects of the present invention. In the agricultural field, a fertilizer injector for the subsurface injection of a liquid fertilizer employing the fluid distribution system, including the control system for varying a liquid blend and application rate is one example.

The invention in its various aspects is therefore to be considered limited solely by the scope of the appended claims.

I claim:

1. A flow divider for fluent materials comprising:
   a rotor having an axis of rotation and axially spaced inlet and outlet ends;
   a flow passage through the rotor, from the inlet end to the outlet end, the flow passage having a flow passage outlet at the outlet end of the rotor, the flow passage outlet being spaced radially from the axis of rotation;
   rotor drive means for rotating the rotor about the axis of rotation;
   a stator including an annular array of collection chambers surrounding the axis of rotation and with open inlet sides spaced radially from the axis of rotation to be confronted in sequence by the flow passage outlet as the rotor rotates; and
   discharge openings from the respective collection chambers, each discharge opening having an area smaller than that of the open inlet side of the associated collection chamber.

2. A flow divider according to claim 1 wherein the array of collection chambers comprises an annulus around the axis of rotation and dividers segmenting annulus into the collection chambers.

3. A flow divider according to claim 1 wherein the flow passage has a flow passage inlet at the inlet end of the rotor, concentric with the axis of rotation.

4. A flow divider according to claim 1 wherein the stator comprises a housing surrounding the rotor.

5. A flow divider system for dividing a flow of a fluent material, said system comprising:
   a first flow divider including a fluent material inlet and a plurality of first divider outlets;

a plurality of second flow dividers, each having a second divider inlet coupled to a respective one of the first divider outlets and each having a plurality of second divider outlets;

each of said flow dividers comprising:
 a rotor having an axis of rotation and axially spaced rotor inlet and rotor outlet ends;
 a flow passage through the rotor, from the rotor inlet end to the rotor outlet end, the flow passage having a flow passage outlet at the rotor outlet end and spaced radially from the axis of rotation of the rotor;
 rotor drive means for rotating the rotor about the axis of rotation;
 a stator including an annular array of collection chambers surrounding the axis of rotation, with open inlet sides spaced radially from the axis of rotation to be confronted in sequence by the flow passage outlet as the rotor rotates, the divider outlets comprising outlets from respective ones of the collection chambers; and pump means between the first divider and the second dividers, the pump means comprising a multi-way diaphragm pump with plural inlets coupled to respective ones of the first flow divider outlets and plural pump discharges connected to respective one of the second flow divider flow passage inlets.

6. A system according to claim 5 wherein each flow passage has a flow passage inlet at the inlet end of the rotor, concentric with the axis of rotation.

7. A system according to claim 5 wherein in each flow divider the stator comprises a housing surrounding the rotor.

8. A liquid delivery apparatus having a source of liquid to be distributed, a plurality of liquid delivery devices and a flow divider system for delivering the liquid to the delivery devices, said flow divider system comprising:
 a first flow divider including a fluent material inlet and a plurality of first divider outlets;
 a plurality of second dividers, each having a second divider inlet coupled to a respective one of the first divider outlets and each having a plurality of second divider outlets;
 each of said flow dividers comprising:
  a rotor having an axis of rotation and axially spaced rotor inlet and rotor outlet ends;
  a flow passage through the rotor, from the rotor inlet end to the rotor outlet end, the flow passage having a flow passage outlet at the rotor outlet end, spaced radially from the axis of rotation of the rotor;
  rotor drive means for rotating the rotor about the axis of rotation;
  a stator including an annular array of collection chambers surrounding the axis of rotation, with open inlet sides spaced radially from the axis of rotation to be confronted by the flow passage outlet in sequence as the rotor rotates, the divider outlets comprising outlets from respective ones of the collection chambers; and
 said source of liquid to be distributed comprising:
  a plurality of supplies of different liquids;
  means for providing a flow of each liquid from the respective supply thereof;
  mixing means for mixing the flows of the liquids to produce a liquid mixture; and
  means for delivering the mixed liquids to the flow passage inlet of the first divider.

9. A system according to claim 8 including valve means for selectively varying the flow of each liquid.

10. A system according to claim 9 including control means for controlling the operation of the valve means according to selected dispenser operating parameters.

11. An agricultural chemical dispenser for dispensing agricultural chemical varying liquids over an agricultural field, the dispenser comprising an apparatus according to claim 10 and the control means including:
 means for recording a map of liquid application requirements of the field;
 position sensor means for monitoring the position of the apparatus in the field;
 means for determining from the map and from the position sensor means the liquid application requirements of the current position of the apparatus in the field;
 means for controlling the valve means to vary the mixture of liquids to correspond to the current position liquid application requirements.

12. Apparatus according to claim 11 wherein the pump means comprise variable speed pump means and the control means comprise means for controlling the pump means to vary the rate of liquid delivery to correspond to said current position liquid application requirements.

* * * * *